(No Model.)
N. A. OTTO.
IGNITING APPARATUS FOR GAS OR OIL MOTOR ENGINES.
No. 406,762. Patented July 9, 1889.
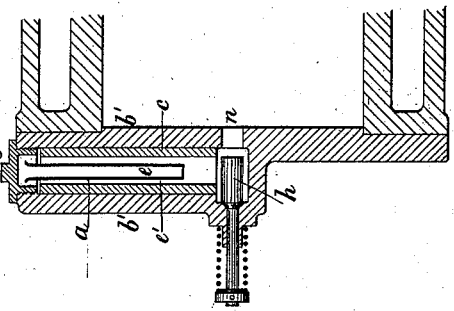
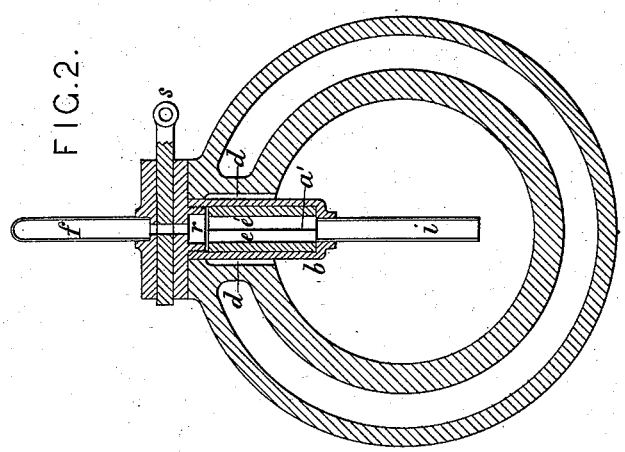
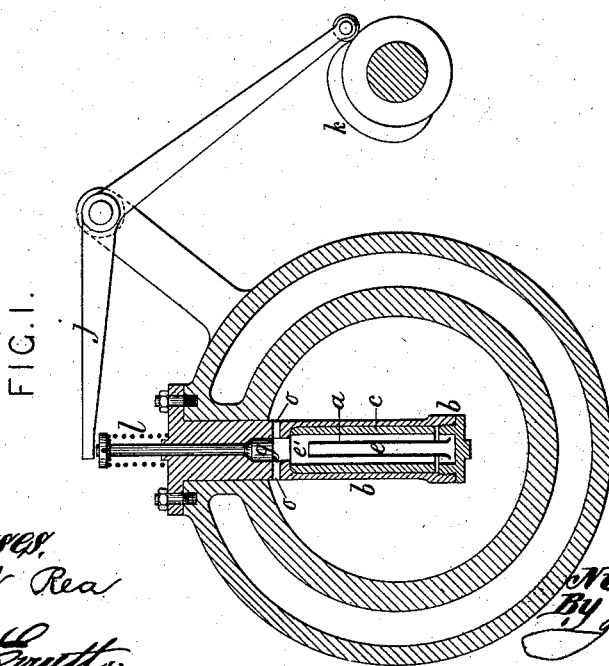
Witnesses,
Geo. W. Rea
Robert Grutt
Inventor:
Nicolaus A. Otto,
By James L. Norris,
Atty.

UNITED STATES PATENT OFFICE.

NICOLAUS AUGUST OTTO, OF COLOGNE, ASSIGNOR TO THE GAS-MOTOREN-FABRIK-DEUTZ, OF DEUTZ-ON-THE-RHINE, GERMANY.

IGNITING APPARATUS FOR GAS OR OIL MOTOR-ENGINES.

SPECIFICATION forming part of Letters Patent No. 406,762, dated July 9, 1889.

Application filed November 6, 1888. Serial No. 290,072. (No model.) Patented in Italy January 3, 1888, XLVIII, 93; in England October 5, 1888, No. 14,349; in Belgium, October 13, 1888, No. 83,856, and in France November 5, 1888, No. 193,908.

*To all whom it may concern:*

Be it known that I, NICOLAUS AUGUST OTTO, a citizen of Prussia, residing at Cologne, in the Empire of Germany, have invented a new and useful Igniting Apparatus for Gas or Oil Motor-Engines, (for which I have obtained patent in Belgium, dated October 13, 1888, No. 83,856; in France, dated November 5, 1888, No. 193,908; in Italy, dated January 3, 1888, No. XLVIII, 93, and have made application for patent in Great Britain, which patent when granted will bear date October 5, 1888, No. 14,349,) of which the following is a specification.

This invention relates to igniting apparatus for gas or oil motor-engines wherein the ignition of the combustible charge is effected by bringing a portion of the same at the required moment in contact with a body maintained in a state of incandescence. For this purpose there have heretofore been used metal tubes heated externally, into the interior of which a portion of the compressed charge was admitted. Such incandescent tubes, although they effect with certainty the ignition of the charges, do, however, not insure the permanently reliable working of the engine. As these tubes have to withstand an internal pressure of about twelve atmospheres while in a state of high red heat, they must be made comparatively thick, while for the ready conduction through them of the heat from the external source they should be made as thin as possible; also, owing to the continual heating and oxidizing action of the external flame, the metal of the tube becomes gradually weakened, so that fractures of the tubes frequently take place, resulting in the interruption of the working of the engine.

The present invention has mainly for its object to obviate the above defect of such igniting apparatus; and it consists in inclosing an incandescent body in a cavity or chamber in which at the required moment a portion of the compressed charge is made to come in contact with all sides of the incandescent body, so that this is not subjected to any one-sided pressure, the said body being maintained at the required state of incandescence by the heat produced by the combustion of the charge without requiring any external heating. The said chamber or cavity may either be formed in the side of the cylinder or it may be contained entirely within the cylinder, so that the outer surface is not in contact with the atmosphere, but receives additional heat from the combustion in the cylinder.

The accompanying drawings show, by way of example, three different arrangements for carrying out the invention.

In Fig. 1 the incandescent body consists of a metal tube $a$, which is contained in a cylindrical chamber $b$, contained within the cylinder-space, a cross-section of the chamber and tube being shown at Fig. $1^a$. At Fig. 3 a similar tube is arranged in a cavity or chamber $b'$, formed in the end of the cylinder, and at Fig. 2 the incandescent body consists of a flat metal plate $a'$, contained within a chamber $b$, which is partly contained within the cylinder-space. Fig. $2^a$ shows a cross-section of the chamber and igniting-plate.

The chambers $b$ and $b'$ are lined internally with fire-clay or other suitable refractory bad conductor of heat, and the tubes $a$ and plate $a'$ are so arranged as to form on each side thereof narrow channels $e\ e'$ in the chamber. These channels are made to communicate at the required moment with the interior of the cylinder, at which time a portion of the compressed combustible charge consequently enters them and becomes ignited by coming into intimate contact with the surface of the incandescent body.

This igniting apparatus can of course only operate in the described manner when the incandescent body has been brought to a bright red heat by the heating action of the successive burning charges after the engine has been already at work for a short time. It is therefore necessary that the motor-engine should be provided with a supplemental igniting apparatus of any suitable known construction—such as an electrical igniter—for working it for a short time until the above-stated condition has been brought about.

In the arrangement at Fig. 1 the igniting apparatus is entirely surrounded by the combustible charge in the cylinder. At Fig. 2 it is partly surrounded by products of combustion which always remain in the annular space d d.

The outer casing of the igniting apparatus when arranged within the cylinder, as at Figs. 1 and 2, becomes highly heated, but not red-hot, as, in the first place, it is cooled by the incoming fresh combustible charges, and, secondly, it imparts a portion of its heat to the fire-clay lining c. This lining also becomes heated by the combustion taking place in the channels e e', thus preventing any cooling of the incandescent body a or a'. By the said combustion in the channels e e' the tube e or plate e' are maintained at a bright-red heat, and as the combustible mixture entering the channels e e' comes in contact with all sides thereof they offer a considerable surface for effecting ignition, which consequently takes place with great certainty.

In Fig. 1 the igniting-channels e e' communicate by the openings o o with the cylinder-space, which openings are closed except at the required moments by means of a piston-valve g, which is depressed for this purpose by a lever j, actuated by the cam k on the engine-shaft or counter-shaft, and which when freed by the lever is raised into the position shown for establishing the communication between the cylinder and igniting-chamber by means of a spring k. A portion of the compressed combustible charge then enters the chamber through the openings o and is ignited by contact with the tube a, as before described, the resulting flame passing out through the openings o o and igniting the combustible charge in the cylinder.

In the arrangement at Fig. 3 the cylinder-space communicates with the channels e e' of the igniting-chamber by a circular opening n, which is also closed by the piston-valve h, except at the moment of firing the charge.

In the arrangement at Fig. 2 the admission of the combustible charge into the firing-chamber is effected by the slide s in the following manner: On the slide-cover is fixed a tubular chamber f, which, when the slide is in the position shown, communicates with the igniting-channels e e' through an opening in the slide and a corresponding opening r in the top of the igniting-chamber. While the slide is in the position closing this communication, the channels e e' and tubular extension i remain filled with products of combustion of the previous charge, so that the fresh compressed combustible charge cannot penetrate sufficiently far up the tube i to come in contact with the igniting-plate a'; but when the slide is moved into the position establishing a communication with f the products of combustion will be forced up into the latter, so that a portion of the combustible charge can then pass into the channels e e' and become ignited, the flame passing down the tube i and firing the charge in the cylinder.

Having thus described the nature of my invention and the best means I know for carrying the same into practical effect, I claim—

1. In an igniting apparatus for gas or oil motor-engines, an incandescent metal tube contained within a chamber forming a narrow annular channel around it and a central channel through it, said passages communicating with the cylinder-space by an opening controlled by a valve or slide, a portion of the combustible charge in the cylinder being admitted at the required moment into said channels, so as to come into intimate contact with both the inner and outer surfaces of the incandescent tube and be ignited thereby, the heat of the incandescent body being maintained by the said combustion, substantially as described.

2. In an igniting apparatus for gas or oil motor-engines, an incandescent body of fire-clay or other suitable refractory bad conductor of heat formed as a lining to a metal chamber projecting into the cylinder and containing a refractory metal tube, the interior of such chamber being put in communication with the interior of the cylinder at the required moment by a slide or valve controlling an opening from the cylinder to such chamber, so that a portion of the combustible charge passes into the said chamber and becomes ignited by contact with the incandescent refractory lining and tube, such lining and tube being maintained in a state of incandescence both by the combustion within it and by the heat of the combustion in the cylinder transmitted through the walls of the chamber, substantially as herein described.

In testimony whereof I have signed my name to this specification, in the presence of two subscribing witnesses, this 17th day of October, A. D. 1888.

NICOLAUS AUGUST OTTO.

Witnesses:
  PET. LANGEN,
  EDUARD KIRSCHSIEPER.